US009046047B2

(12) United States Patent
Sangameswaran et al.

(10) Patent No.: US 9,046,047 B2
(45) Date of Patent: Jun. 2, 2015

(54) CONTROL FOR STOP/START VEHICLE WHEN APPROACHING CONTROLLED INTERSECTIONS

(71) Applicant: Ford Global Technologies, LLC, Dearborn, MI (US)

(72) Inventors: Sangeetha Sangameswaran, Canton, MI (US); Mathew Alan Boesch, Plymouth, MI (US); George Edmund Walley, Novi, MI (US); John Anthony Lockwood, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 69 days.

(21) Appl. No.: 13/792,449

(22) Filed: Mar. 11, 2013

(65) Prior Publication Data
US 2014/0257637 A1    Sep. 11, 2014

(51) Int. Cl.
*A01B 69/00* (2006.01)
*B62D 6/00* (2006.01)
*F02D 29/02* (2006.01)
*B62D 5/04* (2006.01)

(52) U.S. Cl.
CPC ............ *F02D 29/02* (2013.01); *F02N 2200/125* (2013.01); *B62D 5/0481* (2013.01)

(58) Field of Classification Search
USPC ......................................................... 701/112
See application file for complete search history.

(56) References Cited

U.S. PATENT DOCUMENTS

| | | | |
|---|---|---|---|
| 6,334,834 B1 * | 1/2002 | Mizutani et al. .............. 477/203 |
| 6,553,287 B1 | 4/2003 | Supina et al. | |
| 6,629,515 B1 * | 10/2003 | Yamamoto et al. ......... 123/179.4 |
| 6,675,094 B2 | 1/2004 | Russell et al. | |
| 6,763,903 B2 * | 7/2004 | Morimoto et al. .......... 180/65.26 |
| RE40,164 E | 3/2008 | Kuang et al. | |
| 7,552,705 B2 * | 6/2009 | Serkh et al. ................. 123/179.4 |
| 7,657,350 B2 * | 2/2010 | Moran ............................ 701/22 |
| 8,019,506 B2 * | 9/2011 | Markiton et al. ............... 701/41 |
| 8,280,599 B2 * | 10/2012 | Suzuki et al. .................... 701/54 |
| 8,574,122 B2 * | 11/2013 | Gibson et al. .................... 477/77 |
| 8,646,427 B2 * | 2/2014 | Monnier et al. .......... 123/179.28 |
| 2004/0002794 A1 * | 1/2004 | Pillar et al. ......................... 701/1 |
| 2005/0060069 A1 * | 3/2005 | Breed et al. ...................... 701/29 |
| 2005/0239436 A1 | 10/2005 | Bell et al. | |
| 2009/0171547 A1 | 7/2009 | Hyde et al. | |
| 2010/0125402 A1 | 5/2010 | Bansal et al. | |
| 2010/0286868 A1 | 11/2010 | Ehara et al. | |
| 2011/0012424 A1 * | 1/2011 | Wortberg et al. ............. 307/10.1 |
| 2011/0071746 A1 * | 3/2011 | O'Connor Gibson et al. ............................. 701/101 |
| 2012/0330508 A1 * | 12/2012 | Pebley et al. .................... 701/41 |
| 2012/0330529 A1 | 12/2012 | Pebley et al. | |

FOREIGN PATENT DOCUMENTS

| | | |
|---|---|---|
| DE | 3019709 A1 | 12/1981 |
| JP | 2004232557 A2 | 1/2003 |
| JP | 200607456 A2 | 3/2006 |

* cited by examiner

*Primary Examiner* — Bhavesh V Amin
(74) *Attorney, Agent, or Firm* — David B. Kelley; Brooks Kushman P.C.

(57) ABSTRACT

A controller in a stop/start vehicle may anticipate a vehicle stop and engine shutdown event in response to detecting a vehicle approach to an intersection. The controller may disable a power steering system or otherwise prepare vehicle subsystems for shutdown prior to the anticipated shutdown event. The controller may also enable the power steering system in response to anticipating an automatic restart event.

20 Claims, 4 Drawing Sheets

CONTROL FOR STOP/START VEHICLE WHEN APPROACHING CONTROLLED INTERSECTIONS

TECHNICAL FIELD

This disclosure relates to stop/start vehicles and controlling stop/start activities when approaching a controlled intersection.

BACKGROUND

Stop/start vehicles may be equipped with an engine autostop function. This function automatically shuts down the engine during certain periods of operation to conserve fuel. For example, the autostop function may be engaged when the vehicle is stopped rather than permitting the engine to idle. The engine may be restarted when the driver releases the brake or actuates the accelerator.

SUMMARY

A method for controlling a stop/start vehicle includes detecting a vehicle approach to an intersection, anticipating an engine shutdown in response to the detected approach, and disabling a power steering system prior to an anticipated engine shutdown event. The method further includes anticipating an automatic restart event, and enabling the power steering system in response to the anticipated restart event.

In some embodiments, anticipating an engine shutdown in response to a detected vehicle approach to an intersection includes detecting that the intersection has an active or passive traffic control device, such as a traffic light or stop sign, respectively. In one embodiment, anticipating an engine shutdown event in response to the anticipated stop includes detecting a traffic light status, a vehicle position relative to the intersection, a status of a second vehicle at the intersection, or a combination thereof. In such an embodiment, an automatic restart event can be anticipated in response to similarly detected information about the traffic light, the intersection, or the status of a second vehicle.

In some embodiments, anticipating an engine shutdown in response to a detected vehicle approach to an intersection includes detecting that the intersection has a stop sign. In such an embodiment, anticipating an engine shutdown event in response to the anticipated stop includes detecting whether the intersection is a two-way or four-way stop, detecting cross traffic information, detecting a position of the vehicle relative to the intersection, detecting a status of a second vehicle at the intersection, or detecting some combination of the above. In such an embodiment, an automatic restart event could be anticipated in response to similarly detected information about the stop sign, the intersection, cross traffic information, or status of a second vehicle.

In various embodiments, the method may further include performing other preparatory steps in response to the anticipated shutdown event. Such steps could include, for example, enabling an auxiliary pump, adjusting an alternator output, preparing a voltage stabilization device to switch to battery power, or some combination thereof. The auxiliary pump may be a transmission auxiliary pump or an auxiliary heater core pump.

An embodiment of a system for controlling an internal combustion engine according to the present disclosure includes at least one sensor that provides a signal indicative of a vehicle approaching an intersection. The system also includes a controller in communication with the at least one sensor. The controller selectively disables a power steering system based on a determination of whether or not an engine shutdown event is anticipated in response to the vehicle approaching the intersection. In various embodiments of the system, the at least one sensor may include a camera, a GPS system, a LiDAR system, a RADAR system, or some combination of the above.

In some embodiments of the system, the controller may perform other functions in response to an anticipated shutdown event. These functions may include, for example, selectively enabling an auxiliary pump, selectively adjusting an alternator output, selectively preparing a voltage device, or a combination of the above. The controller may also be configured to selectively enable the power steering system in response to anticipating an engine restart event.

Embodiments according to the present disclosure provide a number of advantages. For example, various embodiments may improve fuel economy by preparing for an autostop event and trying to autostop the engine earlier at traffic light situations. Embodiments according to the present disclosure may also improve launch performance by preparing for an autostart event and trying to restart the engine earlier than provided for in previously implemented start-stop systems.

The above advantage and other advantages and features of the present disclosure will be readily apparent form the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one possessing skill in the art to variously employ the present invention.

As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Stop/start vehicles are powered by conventional internal combustion engines and equipped with a stop/start system controlling autostop and autostart functions. The stop/start system may autostop the engine when the vehicle is stopped and the engine is not required for propulsion or other purposes. At a later time, the stop/start system may autostart the engine when required for propulsion or other purposes. By disabling the engine when possible, overall fuel consumption is reduced. Unlike true hybrid vehicles, stop/start vehicles are generally not capable of pure electric propulsion. Furthermore, unlike true hybrid vehicles, stop/start vehicles are not equipped with a traction battery, but are rather equipped with a conventional starting, lighting, and ignition (SLI) battery.

Figure 1:
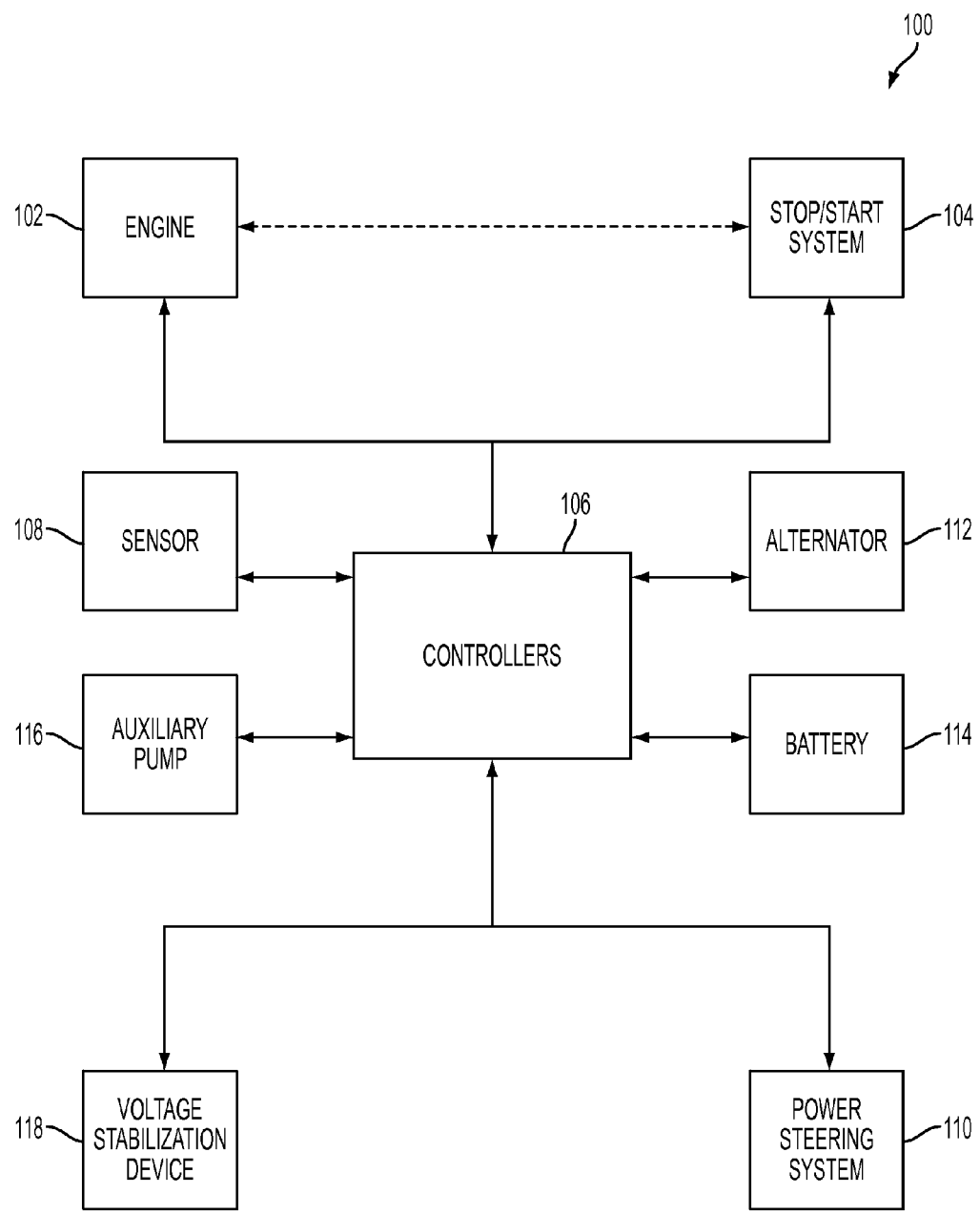
FIG. 1 is a block diagram of a representative stop/start vehicle according to one embodiment of the present disclosure.

Referring now to FIG. 1, a representative vehicle system according to the present disclosure is illustrated in block diagram form. The vehicle 100 includes an engine 102 that may be controlled by stop/start system 104, as indicated by the dashed line. Stop/start system 104 comprises a base stop/start logic that issues autostop commands and autostart commands based on signals from various vehicle subsystems and components (not pictured), including a gear lever, a speed sensor, an accelerator pedal, and a brake pedal. Generally speaking, the base stop/start logic comprises determining whether the vehicle has been stopped for at least a threshold time, and if so issuing an autostop command. An autostart command will be issued in response to a request from the driver, such as when the accelerator pedal is actuated or when the gear lever is moved out of Drive, or in response to a request from another subsystem, such as when the battery state of charge drops below a threshold state of charge. The engine will be automatically shut down in response to an autostop command and will be automatically restarted in response to an autostart command. Stop/start system 104 and engine 102 are both in communication with or under the control of at least one controller 106, as indicated by the solid lines.

Controllers 106 additionally communicate with or control one or more sensors, such as sensor 108, as indicated by the solid line. In various embodiments, sensor 108 may be implemented by one or more sensors including a camera, a GPS system, a RADAR system, a LiDAR system, or other sensors. An exemplary embodiment of a vehicle including sensors 108 and controllers 106 is described below with respect to FIG. 2.

Controllers 106 further communicate with or control other vehicle subsystems as indicated by solid lines, including power steering system 110, alternator 112, battery 114, auxiliary pump 116, and voltage stabilization device 118. Auxiliary pump 116 may be, for example, an auxiliary heater core pump or a transmission auxiliary pump.

Figure 2:
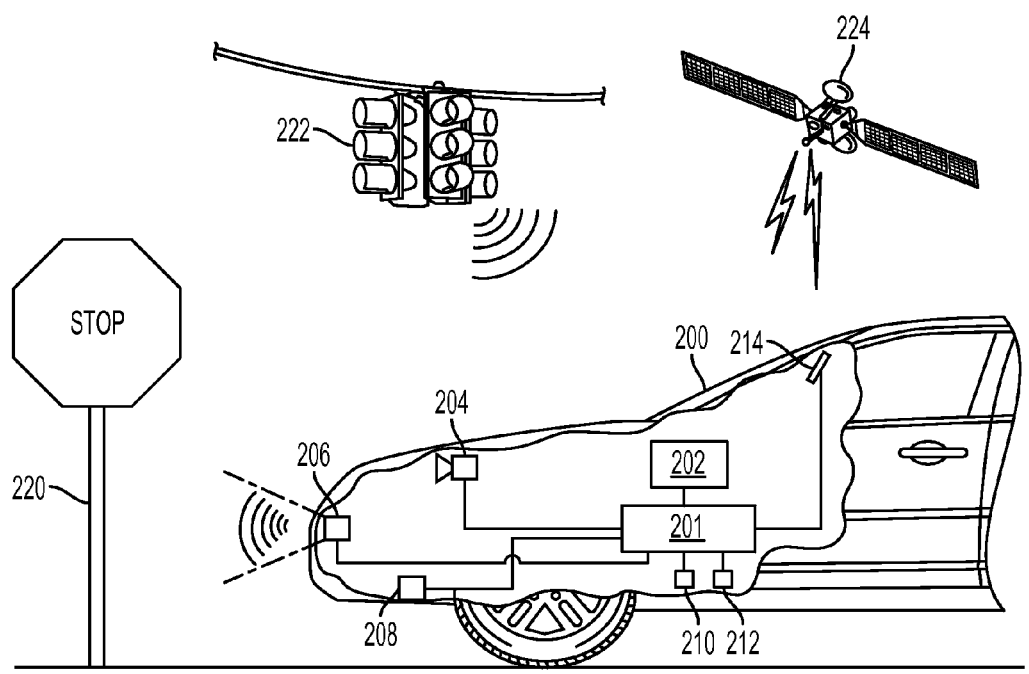
FIG. 2 illustrates a representative stop/start vehicle according to one embodiment of the present disclosure.

With reference to FIG. 2, an exemplary vehicle 200 comprising a plurality of sensors is illustrated. Controllers 201 communicate with camera 204, forward object detector 206, turn signal indicator 208, wheel angle sensor 210, and accelerometer 212. Forward object detector 206 may comprise a RADAR or LiDAR system. Controllers 201 also communicate with transceiver 214, which may send or receive signals from satellites 224, stop lights 222 configured to broadcast traffic information, or other vehicles similarly equipped with a transceiver. Signals received by transceiver 214 from satellites 224 may be processed by GPS 202 to resolve present vehicle coordinates.

FIG. 2 also illustrates representative external traffic control devices that may be detected and recognized by vehicle 200. A passive traffic control device, such as stop sign 220, may be a two-way stop sign or a four-way stop sign. A passive traffic control device may include a transmitter or transceiver that periodically transmits a signal including identification information, such as the type of traffic control device (2-way stop, all-way stop, yield, etc.), or transmits an identification signal in response to receiving a signal from, or otherwise detecting an approaching vehicle. Controllers 106 may detect the presence of a stop sign and whether it is a two-way stop, four-way stop, or other stop through optical detection using camera 204 or in response to stored mapping data. Stop light 222 may be configured to broadcast a signal indicating whether the light is red, yellow, or green, and may be further configured to broadcast timing information indicating when the light will change. Controllers 201 may receive broadcast information using transceiver 214 or optically detect the color of the light using camera 204.

In one embodiment of a system or method, described with reference to FIGS. 1 and 3, a vehicle stop is anticipated in response to a vehicle approach to an intersection at operation 300. The controllers 106 may anticipate a vehicle stop in response to signals from sensor 108. Anticipating a vehicle stop may comprise detecting that the intersection has a traffic light or a stop sign. In another configuration, anticipating a vehicle stop may comprise the use of stored mapping data or traffic data in conjunction with GPS data.

It is then determined whether a vehicle automatic shutdown event is anticipated at operation 302. This determination may be performed by controllers 106 in response to signals from sensor 108. A shutdown event will be anticipated if the signals from sensor 108 indicate that the vehicle stop will likely be lengthy enough that stop/start system 104 will issue an autostop command. Examples of how this determination may be performed are provided below and explained in conjunction with FIG. 4.

If the intersection has a traffic light, a vehicle shutdown event may be anticipated in response to detecting a traffic light status, detecting a position of the vehicle relative to the intersection, detecting a status of a second vehicle at the intersection, or a combination of the above. If the traffic light is configured to broadcast detailed information regarding the timing and duration of the traffic signals, then detecting a traffic light status may comprise receiving such broadcast information, and a shutdown may be anticipated if the vehicle stop will be lengthy. Detecting a traffic light status may also comprise optical detection of whether the light is red, yellow, or green. If the light is yellow or has just changed to red, then a vehicle shutdown event may be anticipated because the vehicle stop is typically longer in such situations. Detecting a position of the vehicle relative to the intersection may comprise, for example, detecting whether the vehicle is the first car at the traffic light or behind another vehicle. This detection may be performed by optical recognition, RADAR, LiDAR, or other methods known in the art. If the vehicle is behind other vehicles, then a shutdown may be anticipated because the vehicle stop is likely longer in such a situation. Detecting a status of a second vehicle at the intersection may comprise receiving a signal broadcast by the second vehicle that indicates the second vehicle's status, e.g. whether the second vehicle is parked or in gear, whether the second vehicle's engine is stopped, or whether the second vehicle's engine is being restarted. In another configuration, detecting a status of a second vehicle may comprise optical detection of the second vehicle's status, such as optical recognition of brake lights. If the second vehicle is stopped, parked, or the engine is stopped, a shutdown may be anticipated because the vehicle stop is likely longer in such situations. The determination may be made based upon a combination of the above signals and inputs as well.

If the intersection has a stop sign, a vehicle shutdown event may be anticipated in response to detecting whether the intersection is a two-way or four-way stop, detecting cross traffic information, detecting a position of the vehicle relative to the intersection, detecting a status of a second vehicle at the intersection, or a combination of the above. Detecting whether the intersection is a two-way or four-way stop may comprise the use of mapping data, optical recognition of the signage, or other methods known in the art. If a four-way stop is detected, then a vehicle shutdown may be anticipated because four way stops may be lengthy. If a two-way stop is detected, then a vehicle shutdown may not be anticipated because such stops are typically brief. Other types of stops, such as one-way stops at a T-junction, may be similarly brief and so a vehicle shutdown may not be anticipated at such stops. Detecting cross traffic information may comprise optical recognition of cross traffic, using RADAR or LiDAR to detect cross traffic, or other methods known in the art. If substantial cross traffic is detected, then a shutdown may be anticipated because the stop is likely to be longer. Detecting a position of the vehicle relative to the intersection and detecting a status of a second vehicle at the intersection may be performed in a similar fashion as was described above with respect to intersections with traffic lights. The determination may be made upon a combination of the above signals and inputs as well. For example, if a two-way stop is detected, but substantial cross traffic is also detected, then a shutdown may be anticipated because the vehicle will likely have to wait for a break in traffic before proceeding.

Figure 3:
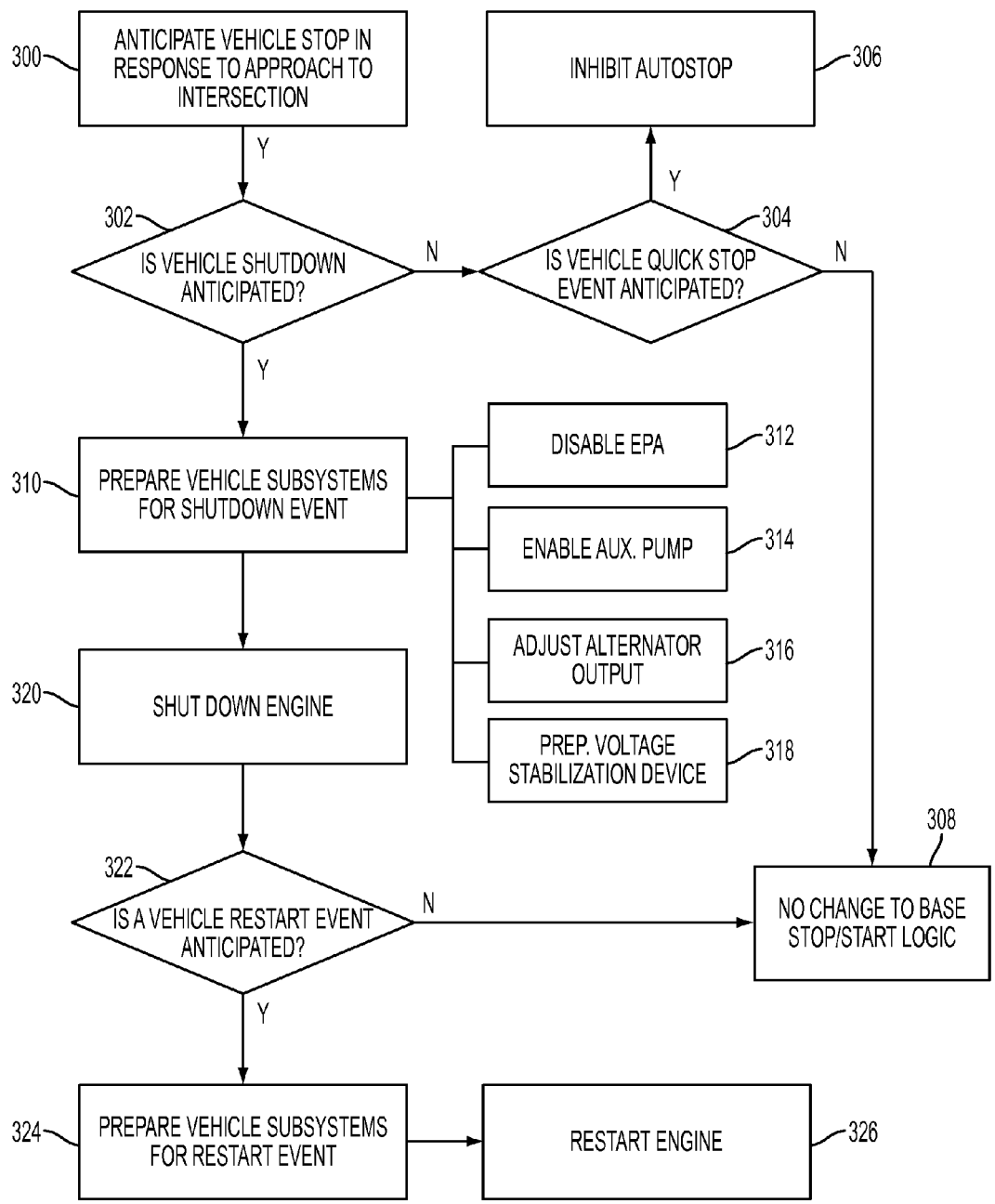
FIG. 3 is a flowchart illustrating an algorithm for controlling a stop/start vehicle.

Returning to operation 302 in FIG. 3, if a vehicle shutdown event is not anticipated, then it is determined whether a vehicle quick stop event is anticipated at operation 304. A quick stop event occurs when a vehicle briefly comes to a stop, but quickly resumes motion. During such brief stops, autostopping the engine results in no fuel savings benefit because the fuel used to autostart the engine when resuming motion equals or exceeds the fuel savings from stopping the engine during the vehicle stop. The determination of operation 304 may be performed by the controllers 106 based on similar inputs as those described above with respect to operation 302. If a quick stop event is anticipated, then the controllers 106 command the stop/start system 104 to inhibit the autostop function at operation 306. The algorithm then returns to operation 300. If a quick stop event is not anticipated, then no change is made to the base stop/start logic at operation 308. The algorithm then returns to operation 300.

Returning to operation 302, if a vehicle shutdown event is anticipated, then at least one vehicle subsystem is prepared for a shutdown event prior to the anticipated shutdown at operation 310. In an exemplary embodiment, preparing at least one vehicle subsystem for shutdown comprises disabling the power steering system 110 at operation 312. This operation may be performed by controllers 106. In various other embodiments, preparing at least one vehicle subsystem for shutdown may comprise selectively enabling an auxiliary pump 116 at operation 314, selectively adjusting the output of alternator 112 at operation 316, or selectively preparing a voltage stabilization device 118 to switch to battery power at operation 318. The auxiliary pump 116 may be a transmission auxiliary pump or an auxiliary heater core pump. In both examples, an auxiliary pump may be activated prior to engine shutdown to maintain line pressure after the engine has been shut down. The alternator 112 output may be ramped to match the battery 114 voltage prior to engine shutdown to prevent voltage drops when the engine is shut down, which can cause undesirable effects such as dimming the lights. The voltage stabilization device 118 may be prepared to switch to battery power for vehicle electrical devices that cannot withstand the voltage drop when the engine restarts. All of these steps may be performed or commanded by controllers 106. Subsequently, the engine is automatically shut down at operation 320.

A determination is then made of whether a vehicle restart event is anticipated at operation 322. This determination may be performed by the controllers 106 based on similar inputs as those described above with respect to operation 302 and illustrated by FIG. 5. If no, then the base stop/start logic is unmodified at operation 308. The algorithm then returns to operation 322. If yes, then at least one vehicle subsystem is prepared for a restart event prior to the engine restart at operation 324. In an exemplary embodiment, preparing a vehicle subsystem for restart comprises enabling the power steering system 110. In other embodiments, various other vehicle subsystems may be prepared for restart. Subsequently, the engine is restarted at operation 326. The algorithm then returns to operation 300.

Figure 4:
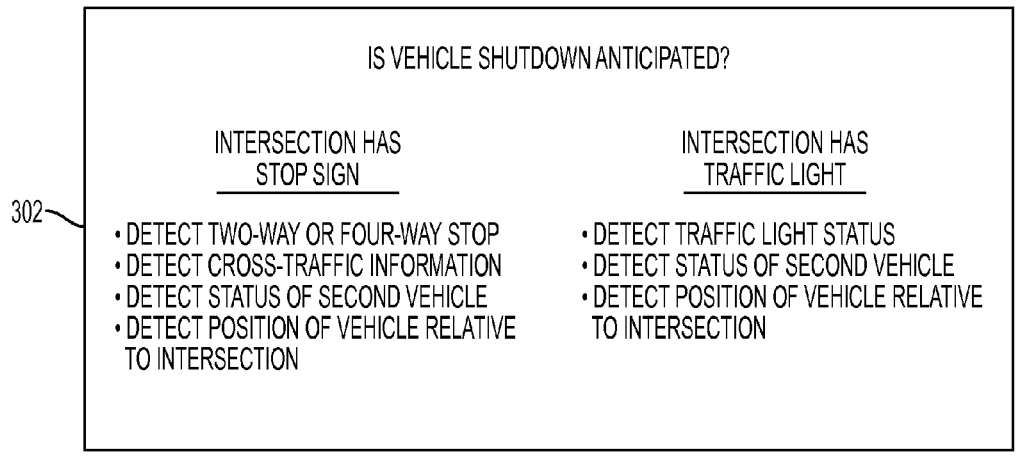
FIG. 4 provides an exemplary list of actions to determine whether a vehicle shutdown is anticipated.
Figure 5:
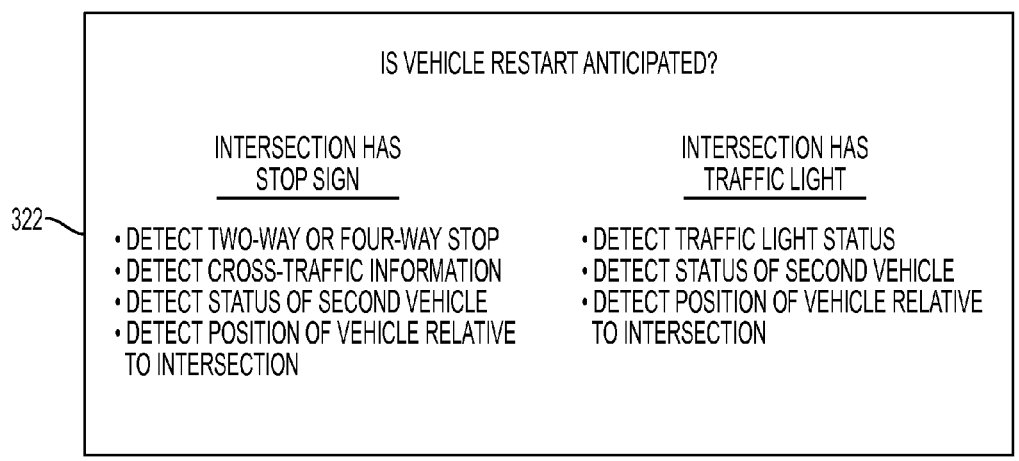
FIG. 5 provides an exemplary list of actions to determine whether a vehicle restart is anticipated.

The diagrams of FIGS. 3-5 provide a representative control strategy for an internal combustion engine having automatic shutdown and automatic restart functions according to the present disclosure. The control strategy and/or logic illustrated in FIGS. 3-5 is generally stored as code implemented by software and/or hardware in controllers 106. Code may be processed using any of a number of known strategies such as event-driven, interrupt-driven, multi-tasking, multi-threading, and the like. As such, various steps or functions illustrated may be performed in the sequence illustrated, in parallel, or in some cases omitted. Although not explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic or code represented by the simplified flow chart of FIGS. 3-5 may be implemented primarily in software with instructions executed by a microprocessor-based vehicle, engine, and/or powertrain controller, such as controllers 106 (FIG. 1). Of course, the control logic may be implemented in software, hardware, or a combination of software and hardware in one or more controllers depending upon the particular application. When implemented in software, the control logic is preferably provided in one or more computer-readable storage media having stored data representing code or instructions executed by a computer to control the engine. The computer-readable storage media may include one or more of a number of known physical devices which utilize electric, magnetic, optical, and/or hybrid storage to keep executable instructions and associated calibration information, operating variables, and the like.

As demonstrated by the embodiments described above, a system or method for controlling an engine having automatic restart and automatic shutdown may anticipate vehicle approaches to an intersection and prepare vehicle subsystems for a shutdown event to conserve fuel economy and/or inhibit a shutdown event to improve drivability. The system or method also improves launch performance by preparing for an autostart event and trying to restart the engine earlier than provided for in previously implemented start-stop systems.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for controlling an engine having automatic restart and automatic shutdown, the method comprising:
    disabling a power steering system prior to an automatic engine shutdown event based on anticipating the automatic engine shutdown event in response to detecting a vehicle approach to an intersection; and
    enabling the power steering system in response to anticipating an automatic engine restart event.

2. The method of claim 1, wherein anticipating the automatic engine shutdown event comprises at least one of detecting a traffic light status, detecting a position of the vehicle relative to the intersection, and detecting a status of a second vehicle at the intersection.

3. The method of claim 2, wherein anticipating an automatic engine restart event comprises at least one of detecting a traffic light status, detecting a position of the vehicle relative to the intersection, and detecting a status of a second vehicle at the intersection.

4. The method of claim 1, wherein anticipating the automatic engine shutdown event comprises detecting that the intersection has a stop sign, and at least one of detecting whether the intersection is a two-way stop or a four-way stop, detecting cross traffic information, detecting a position of the vehicle relative to the intersection, and detecting a status of a second vehicle at the intersection.

5. The method of claim 4, wherein anticipating an automatic engine restart event comprises at least one of detecting whether the intersection is a two-way stop or a four-way stop, detecting cross traffic information, detecting a position of the vehicle relative to the intersection, and detecting a status of a second vehicle at the intersection.

6. The method of claim 1, further comprising enabling an auxiliary pump in response to anticipating the automatic engine shutdown event.

7. The method of claim 6, wherein the auxiliary pump is one of a transmission auxiliary pump and an auxiliary heater core pump.

8. The method of claim 1, further comprising adjusting an alternator output in response to anticipating the automatic engine shutdown event.

9. The method of claim 1, further comprising preparing a voltage stabilization device to switch to battery power in response to anticipating the automatic engine shutdown event.

10. A system for controlling an internal combustion engine comprising:
    at least one sensor that provides a signal indicative of a vehicle approaching an intersection; and
    a controller in communication with the at least one sensor, the controller selectively disabling a power steering system prior to an engine shut down event based on anticipating the engine shutdown event in response to the signal.

11. The system of claim 10, wherein the at least one sensor comprises at least one of a camera, a GPS system, a RADAR system, and a LiDAR system.

12. The system of claim 10, wherein the controller selectively enables the power steering system in response to anticipating an automatic restart event.

13. The system of claim 10, wherein the controller selectively enables an auxiliary pump in response to anticipating the engine shutdown event.

14. The system of claim 10, wherein the controller selectively adjusts an alternator output based on anticipating the engine shutdown event.

15. The system of claim 10, wherein the controller further selectively prepares a voltage stabilization device to switch to battery power in response to anticipating the engine shutdown event.

16. A method for controlling an engine comprising:
    by at least one controller,
        in response to anticipating an engine shutdown in response to sensor data indicating that a vehicle is approaching an intersection, selectively preparing at least one vehicle system for the engine shutdown prior to the engine shutdown; and
        in response to anticipating an automatic engine restart in response to further sensor data, selectively preparing the at least one vehicle system for an automatic engine restart.

17. The method of claim 16, wherein preparing at least one vehicle system for the engine shutdown comprises at least one of disabling a power steering system, shifting a transmission into neutral, enabling an auxiliary pump, adjusting an alternator output, and preparing a voltage stabilization device to switch to battery power.

18. The method of claim 16, wherein anticipating an engine shutdown comprises at least one of detecting a traffic light status, detecting a position of the vehicle relative to the intersection, and detecting a status of a second vehicle at the intersection.

19. The method of claim 16, wherein anticipating an automatic engine restart comprises at least one of detecting a traffic light status, detecting a position of the vehicle relative to the intersection, and detecting a status of a second vehicle at the intersection.

20. The method of claim 16, wherein anticipating an engine shutdown comprises at least one of detecting whether the intersection is a two-way stop or a four-way stop, detecting cross traffic information, detecting a position of the vehicle relative to the intersection, and detecting a status of a second vehicle at the intersection.

* * * * *